(12) United States Patent
Berenberg et al.

(10) Patent No.: US 7,389,505 B2
(45) Date of Patent: Jun. 17, 2008

(54) METHOD AND APPARATUS FOR MODIFYING SOFTWARE

(75) Inventors: Anna Berenberg, Cupertino, CA (US); Michael Yip, Los Altos, CA (US); Gordon MacKean, San Jose, CA (US); James Wanderer, Palo Alto, CA (US); Edward Soloko, Cupertino, CA (US); Yeeping Zhong, Milpitas, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 506 days.

(21) Appl. No.: 10/903,974

(22) Filed: Jul. 30, 2004

(65) Prior Publication Data

US 2006/0026590 A1 Feb. 2, 2006

(51) Int. Cl.
G06F 9/44 (2006.01)
G06F 9/445 (2006.01)

(52) U.S. Cl. .................... 717/172; 717/177
(58) Field of Classification Search ........ 717/168–178; 719/310–320, 328–332
See application file for complete search history.

(56) References Cited

U.S. PATENT DOCUMENTS

| 5,155,837 | A | | 10/1992 | Liu et al. |
| 5,359,730 | A | * | 10/1994 | Marron ........................ 717/169 |
| 5,920,725 | A | * | 7/1999 | Ma et al. ..................... 717/171 |
| 5,923,846 | A | * | 7/1999 | Gage et al. .................. 709/213 |
| 6,131,192 | A | | 10/2000 | Henry |
| 6,266,811 | B1 | * | 7/2001 | Nabahi ........................ 717/174 |
| 6,289,512 | B1 | | 9/2001 | Edwards et al. |
| 6,324,411 | B1 | | 11/2001 | Genell |
| 6,381,742 | B2 | * | 4/2002 | Forbes et al. ............... 717/176 |
| 2002/0066093 | A1 | | 5/2002 | Yen et al. |
| 2002/0073410 | A1 | | 6/2002 | Arne et al. |
| 2003/0074487 | A1 | * | 4/2003 | Akgul et al. ................ 709/328 |
| 2004/0250247 | A1 | * | 12/2004 | Deeths et al. ............... 717/175 |
| 2005/0044541 | A1 | * | 2/2005 | Parthasarathy et al. ..... 717/173 |
| 2006/0282834 | A1 | * | 12/2006 | Cheng et al. ............... 717/174 |

OTHER PUBLICATIONS

Hicks et al., Dynamic Software Updating, ACM, 2000, pp. 1-11.*
Appavoo et al, Enabling Autonomic System Software with Hot-Swapping, pp. 1-35.*
"2717P104EP Office Action mailed Dec. 13, 2007 for European Patent Application 05775076.2", (Dec. 12, 2007), Whole Document.

* cited by examiner

Primary Examiner—Diem K Cao
(74) Attorney, Agent, or Firm—Blakely Sokoloff Taylor & Zafman

(57) ABSTRACT

A computing system receives a compressed archive file that includes a one or more new executable software modules, and a installation file specifying instructions for installing such modules on the computing system. The modules and the installation file are extracted from the compressed archive file, and the modules installed in accordance with the instructions. Instances of executing software modules that correspond to the installed modules are notified about their impending termination. The instances are then terminated before launching corresponding instances of the installed modules.

6 Claims, 3 Drawing Sheets

METHOD AND APPARATUS FOR MODIFYING SOFTWARE

TECHNICAL FIELD

The invention generally relates to the field of computer systems. In particular, the invention relates to modifying, for example, upgrading, or adding functionality to, an executing software application with little or no interruption to the system upon which the software application is being executed.

BACKGROUND

Computer systems can perform many operations. It may be important that such operations not be interrupted to the extent possible. For example, a network device such as a switch or router can play a critical role in establishing and maintaining communications between nodes in a communications network. It is therefore important that the network device remain in operation as much as possible.

Software, for example, whether at the operating system layer, application layer, or at any tier in a multi-tier software architecture, is often being revised, upgraded, and patched to improve or add functionality to the computer system in which the software executes. As an example, a new internetworking protocol may be developed, or an existing protocol revised, and then software implementing such protocol installed on a network device.

Generally, when installing new software on a computing system, the operation of the system may be interrupted, at least insofar as the operation of the system that is controlled by the new software is concerned, and in fact, the computing system may even need to be shutdown and rebooted as part of the installation process. Thus, the desire to improve functionality of the computing system by installing new software often times conflicts with the goal of maintaining the computing system in an operational state as much as possible. For example, upgrading software that executes a new or improved internetworking protocol in a network device may require interrupting operation of the network device, potentially causing interruption in the communications between nodes in a communication network that rely, at least in part, on the network device to maintain such communications.

SUMMARY

The present invention pertains to modifying an executing software application with little or no interruption to the computing system upon which the software application is being executed. A software upgrade package is installed on the computing system, the operating system of the computing system notifies an instance of an existing software module that it is to be updated, gracefully terminates the instance, and starts an instance of the newly installed software module.

BRIEF DESCRIPTION OF THE DRAWINGS

The present invention is illustrated by way of example, and not by way of limitation, in the figures of the accompanying drawings in which.

DETAILED DESCRIPTION

A computing system, whether a general-purpose computer system or optimized, specialized computer system, such as a network switching device, has an operating system that provides basic and essential services for the computer system such as starting and stopping processes, both operating system and application processes, handling input and output functions, maintaining files and file systems or directories, and controlling devices such as peripheral devices and disk drives.

Figure 1:
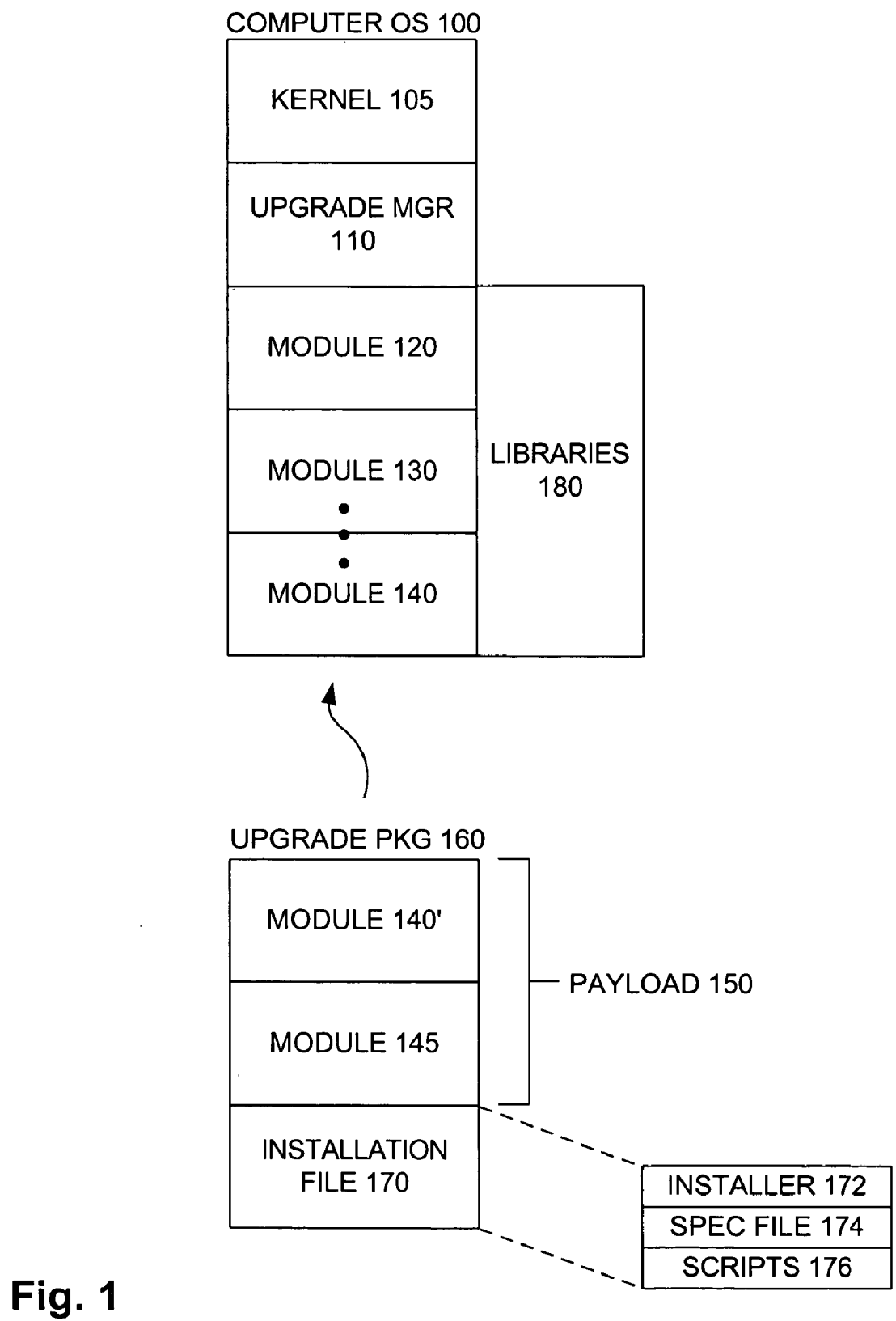
FIG. 1 illustrates an operating system architecture and upgrade package in accordance with an embodiment of the invention.

With reference to FIG. 1, a block diagram of an example operating system (OS) 100 is illustrated. A kernel 105 contains the core functionality of an operating system, and generally is loaded into system memory when the computing system is powered up as part of the booting procedure for the system. Other parts, or modules, of the operating system, such as software modules 120-140, may be loaded at start up or as needed. In a specialized computer system such as a network switching device, each of modules 120-140 may perform a function such as forwarding and filtering data packets, or implement various internetworking protocols such as the well-known Internet Protocol (IP) or Hypertext Transfer Protocol (HTTP).

Libraries 180 typically are smaller programs shared by other modules or application programs that run on the computing system. For example, a device driver might be maintained in a libraries 180, and dynamically linked to from a module when the module, such as module 120, communicates with the device controlled by the device driver.

Upgrading the OS 100, or one or modules thereof, may be necessary to improve or add functionality to the OS 100, or to fix "bugs" in the OS 100. In one embodiment of the invention, an upgrade package 160 is installed to do just that. The upgrade package may include a single file, e.g., a binary image, of the whole OS 100, or one or more binary images of separate modules. For example, upgrade package 160 may include a module 140' that is a new version or revision of already installed module 140. Alternatively, or additionally, upgrade package may include a new module 145 that provides new functionality for OS 100. Furthermore, upgrade package may include one or more shared libraries to be installed in libraries 180. In any case, the one or more modules to be installed are referred to in FIG. 1 as the upgrade package's payload 150.

In addition to payload 150, upgrade package 160 includes an installation file 170. As will be explained in more detail below, installation file 170 provides, among other things, instructions for installing one or more of the modules comprising payload 150 into the operating system 100 of a computing system.

In one embodiment of the invention, the upgrade package is a single compressed archive file (e.g., a .tar, or .tgz format with envelope information), consisting of all the files needed for installation of the upgrade package. For example, if the upgrade package is to replace the entire operating system 100 with a new version, the compressed archive file includes a single binary image of the new version of the operating system 100. Alternatively, the upgrade package may include those modules required to update one or more particular OS modules.

In addition, the compressed archive file includes an installation file 170 that includes instructions for installing at least some portion of the payload 150 in the upgrade package. The installation file itself contains a specification file 174 that identifies the content of the upgrade package. The specification file 174 can contain information regarding the modules present in the upgrade package. A module may comprise one or more binary images. The specification file can list the binary images, and corresponding directories, as well, to be installed. This list may contain all the files that make up OS 100, or some portion thereof. In this manner, the list provides a flexible approach for a patching strategy, software maintenance releases, etc., in which only some of the files, libraries, or directories that make up the OS are upgraded or added.

Additionally the specification file can contain instructions for installing some or all of the binary images, libraries, and directories. In this manner, the same payload can be reused for installation on different computer systems, and only the appropriate binary images in the payload are installed in accordance with the instructions set forth in the specification file. These list of files, directory information, and instructions are prepared and included in the specification file at the time the upgrade package is created.

In one embodiment, the specification file is platform-dependent, that is, a separate specification file, with perhaps a different list of files and/or instructions, is built for each computing system and/or operating system on which the upgrade package is to be installed. For example, if the upgrade package is to be installed on one or more of a family of computer system products, such as a product line of network switch devices manufactured by a particular vendor, a separate specification file can be created for each of the vendor's network switch devices in the product line.

Installation file 170 optionally includes scripts 176 that can be executed without user interaction to perform operations on files and directories in the upgrade package. Alternatively, macros or batch files could also be used to effect the same operations. The use of scripts allows for different upgrade scenarios on different computing platforms and operating systems without requiring source code modification.

In one embodiment of the invention, an upgrade manager 110 is part of the computer operating system 100, and is responsible for receiving and installing an upgrade package in accordance with the instructions set forth the upgrade package's installation file. It is, therefore, problematic to upgrade the upgrade manager itself, either by itself or as part of an upgrade of the operating system. If the upgrade manager cannot be upgraded along with the rest of the operating system by virtue of the fact that it is handling installation of the upgrade, then the version of the upgrade manager lags behind the upgraded version of operating system. To address this issue, upgrade manager 110 is first updated when installing a new version of the operating system. In particular, an installer 172 is loaded at the outset of the installation of the upgrade package. In one embodiment of the invention, the installer 172 is loaded as a dynamically linked library (DLL) to the operating system, and drives the installation procedures for the upgrade package. The upgrade manager parses the specification file 174 to locate and identify information about installing the installer DLL. The installer DLL is computer system platform- and operating system-independent—all platform dependencies are provided by the specification file and any upgrade scripts, as described above.

The goal of upgrade manager is to upgrade operating system 100, or a portion thereof, to a new version of software, or add new functionality to the operating system without interrupting operation of the computer system on which the operating system is running. This is particularly advantageous when the computer system is handling critical computing functions, such as a network switch device that is forwarding and filtering data packets for an internetwork of nodes communicating with each other.

Figure 2:
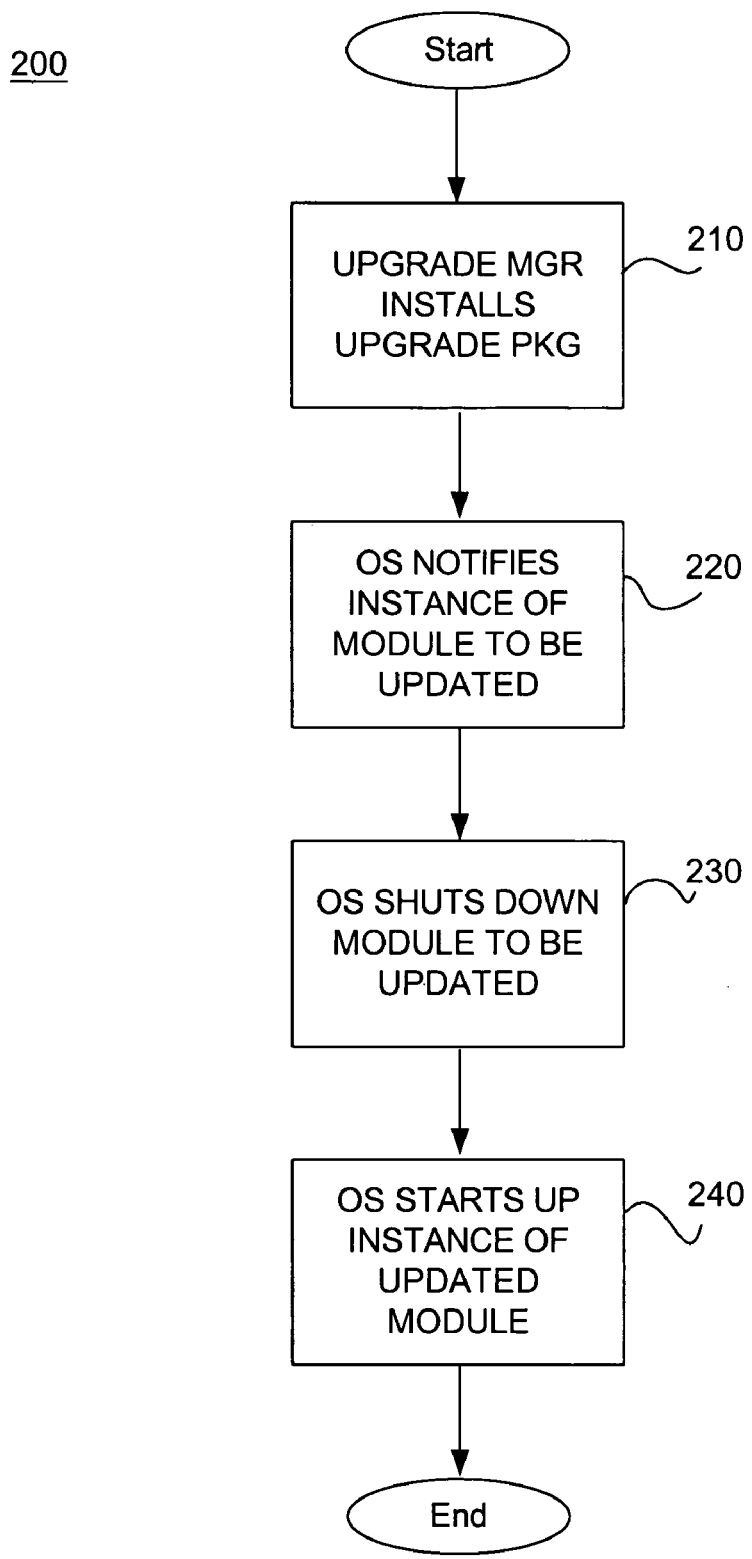
FIG. 2 is a flow diagram of an embodiment of the invention.

With reference to FIG. 2, a process 200 for upgrading software, for example, operating system software or a module thereof, is described. At 210, the upgrade manager 110 installs upgrade package 160. The upgrade package may exist, for example, on a remote server, and is downloaded from the server using a transport protocol such as the Trivial File Transfer Protocol (TFTP). Alternatively, the upgrade package may exist in and be downloaded from a memory card, e.g., compact flash. A user can invoke a Command Line Interface (CLI) command, or the like, requesting the download of a specific upgrade package from a specified origin, whether compact flash or a remote server.

In one computing environment in which an embodiment of the invention may be practiced, two or more computer systems may be in operation, wherein one of the systems is a primary system and the other system is a backup or secondary system, both systems able to provide the same services. For example, two systems, such as redundant network switch devices, could be co-located in a communications network, to provide redundant network switching services for an internetwork of nodes. If the primary network switch device fails to operate properly, the secondary network switch device can take over providing network switching services. Each network switch device has its own management switch module (MSM) that provides for core functionality of the network switch device. If the MSM in the primary network switch device (primary MSM) fails, the MSM in the secondary network switch device (secondary MSM) detects such, becomes the primary MSM, and causes the secondary network switch device to operate as the primary network switch device to provide network switching services. This process of the secondary MSM taking over for the primary MSM in the event of failure of the primary MSM is referred to herein as failover. Alternatively, both MSMs may exist in the same modular switch device, wherein one of the MSMs is the primary MSM and the other is the second MSM, each running their own operating system. Failover between the MSMs would occur in the same manner as described above. The same failover technique can be employed in a stackable network switch architecture as well, wherein each network switch device in the stack maintains its own MSM.

On the example computing environment described above, that is, in a computing environment wherein a primary and a second computing system exist, a user can invoke a Command Line Interface (CLI) command, or the like, requesting the download of a specific upgrade package from a specified origin, whether compact flash or a remote server, not only for the primary computing system, but the secondary computing system as well. Alternatively, the user can request downloading a specific upgrade package from a specified origin to either the primary or the secondary computing system, and such system can automatically invoke such request on behalf of the other computing system as well. In any case, whether the upgrade package exists on a remote server or compact flash he upgrade package is downloaded to both computing systems. Alternatively, in response to a request from the user to download an upgrade package, the computing system receiving the request can download the upgrade package and provide a copy of the same to the other computing system.

The upgrade package in one embodiment of the invention is a compressed archive file. Thus, once the download of the upgrade package is complete, upgrade manager 110 uncompresses the upgrade package to extract the one or more modules to be installed, and the installation file 170. The installation file includes a dynamic link library (DLL) file that provides the latest version of an installer routine 172. The DLL file is loaded into the operating system, in one embodiment, replacing the existing upgrade manager 110, to perform the installation of one or more of the modules in the payload portion 150 of upgrade package 160 in accordance with the instructions set forth in specification file 174 and scripts 176, if any, as described above. In another embodiment, the new installer routine 172 is simply invoked by upgrade manager 110. The installer then reads the specification file to obtain installation instructions, and executes any scripts present as well, as part of the installation process. The appropriate modules are then loaded onto the computing system, per the installation instructions, for example, in a permanent storage medium accessible to the computing system.

At 220, instances of one or more modules executing in the computing system that correspond to the newly installed modules are notified, for example, that an upgrade is to occur. The installer, or, for example, a process manager in the operating system provides this notification. These instances are then able to coordinate notification and/or termination of interprocess communications with other processes, operating system processes, instances of executing software modules, dynamic link libraries, static link libraries, remote procedures, remote objects, device drivers and other network devices. The operating system, or more particularly, an element of the operating system such as a process manager, then shuts down at 230 the instances of the modules that have been upgraded. Instances of the upgraded modules are then started at 240. In this manner, certain modules can be upgraded and restarted, without interrupting operation of the computing system as a whole. For example, in a network switching device, an instance of an internetworking protocol in a multiprotocol stack executing in the network switching device can be notified of an upgrade, and terminate communication with a peer instance of the internetworking protocol executing on a remote device. The instance of the protocol can then be shut down and a new instance of the protocol, based on an upgraded version of the protocol newly installed from an upgrade package, started. As a result, a new version of the protocol is executing while the rest of the operating system remains unchanged.

Figure 3:
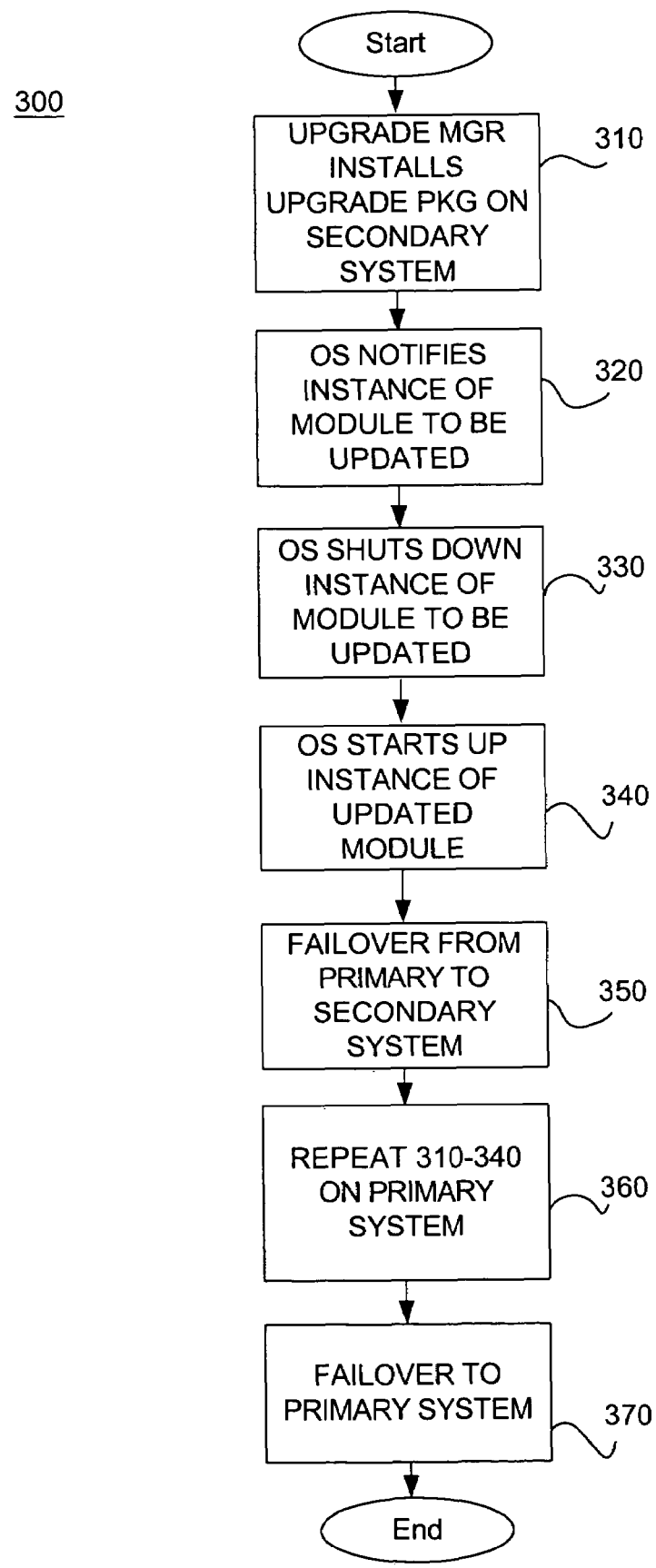
FIG. 3 is a flow diagram of an embodiment of the invention.

FIG. 3 illustrates a software upgrade process 300 in an environment where two computing systems or at least two operating systems are in operation, one operating as the primary-, the other operating as the secondary-system, as in, for example, the dual MSM scenario described earlier. The upgrade process is the same for each system, and is as described above with respect to FIG. 2. At 310, a user invokes on the primary system a CLI command requesting installation of a specified binary image. If a backup or secondary system is detected as present, then the primary system sends the installation request to it. The upgrade manager on the secondary system first installs the upgrade package on the secondary system. During this installation, the primary system operates without interruption, and without any indication that software on the secondary system is being upgraded. At 320, the instances of modules executing in the secondary system that correspond to the newly installed modules are notified by the installer that an upgrade is to occur. These instances are then able to coordinate notification and/or termination of interprocess communications with other processes, whether executing on the secondary system or elsewhere. The secondary system, or more particularly, a component of its operating system, such as a process manager, then shuts down at 330 the instances of the modules that have been upgraded. Instances of the upgraded modules are then started at 240. Once the installation process is complete on the secondary system, the secondary system sends a notification of such to the primary system, and, optionally, the status of the installation, which can be provided to the user that invoked the CLI command requesting the installation.

A user or the upgrade installer on the secondary system then performs a failover from the primary system to the secondary system at 350. The primary system is now the new secondary system, and the secondary system is now the new primary system. At 360, elements 320-340 of the process are repeated on the new secondary system. Once the upgrade package is installed and up and running, optionally, at 370, a failover from the new primary system to the new secondary system is performed.

It should be noted that reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented, for example, in terms of algorithms and symbolic representations of operations on data within a computer memory. These algorithmic descriptions and representations are the means used by those skilled in the data processing arts to most effectively convey the substance of their work to others skilled in the art.

An algorithm is here, and generally, conceived to be a sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as binary digits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise apparent from the discussion throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to apparatuses for performing the operations herein. These apparatuses may be specially constructed for the required purposes, or may comprise a general-purpose computer selectively activated or reconfigured by a computer program stored in the computer. Such a computer program may be stored in a machine-readable storage medium, such as, but not limited to, any type of magnetic or other disk storage media including floppy disks, optical storage media, CD-ROMs, and magnetic-optical disks, read-only memories (ROMs), random access memories (RAMs), EPROMs, EEPROMs, magnetic or optical cards, flash memory devices; or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. In addition, the present invention is not described with reference to any particular programming language. It will be appreciated that a variety of programming languages may be used to implement the teachings of the invention as described herein.

What is claimed is:

1. A method comprising:

receiving a software upgrade package for a software application;

installing the software upgrade package for the software application on a secondary system;

notifying instances of executing software modules of the software application on the secondary system that correspond to the software upgrade package of impending termination;

terminating the instances of executing software modules of the software application on the secondary system;

launching on the secondary system corresponding new instances of the software modules of the software application from the installed software upgrade package;

switching the secondary system to become a new primary system, and an existing primary system to become a new secondary system;

installing the software upgrade package for the software application on the new secondary system;

notifying instances of executing software modules of the software application on the new secondary system that correspond to the software upgrade package for the software application of impending termination; and without interrupting an execution of the software application on the new secondary system, terminating the notified instances of executing software modules of the software application on the new secondary system, and launching on the new secondary system corresponding new instances of the software modules of the software application from the installed software upgrade package.

2. The method of claim 1, further comprising switching the new primary system to become the secondary system, and the new secondary system to become the primary system.

3. The method of claim 1, wherein installing the software upgrade packet for the software application on a secondary system comprises:

receiving a compressed archive file including a plurality of new executable software modules of the software application, and an installation file comprising instructions for installing such modules on the secondary system;

extracting the modules and the installation file from the compressed archive file; and installing the modules in accordance with the instructions.

4. The method of claim 1, wherein the secondary system comprises a computing system.

5. The method of claim 1, wherein the secondary system comprises one of two management switch fabric modules in a modular network switch fabric architecture.

6. The method of claim 1, wherein the secondary system comprises one of a plurality of management switch fabric modules in a stackable network switch fabric architecture.

* * * * *